Sept. 12, 1939.    W. W. SCOTT    2,172,413
SIREN
Filed Dec. 23, 1935
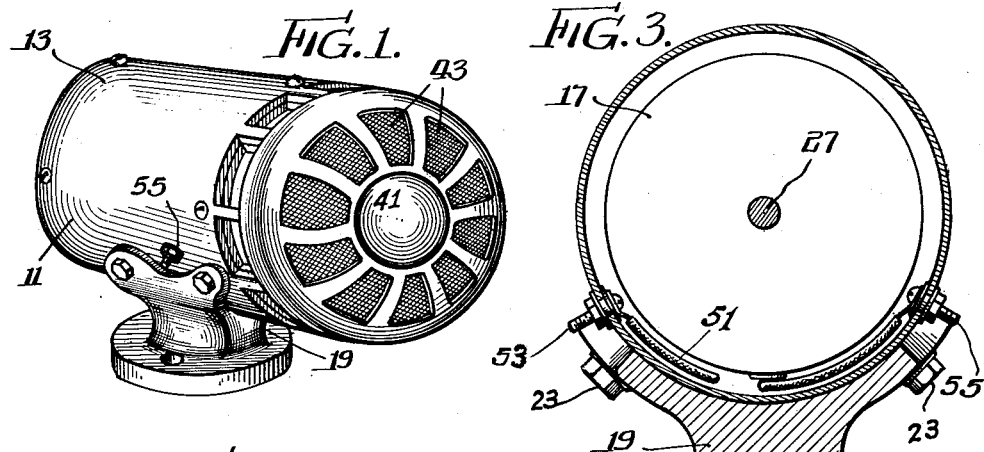
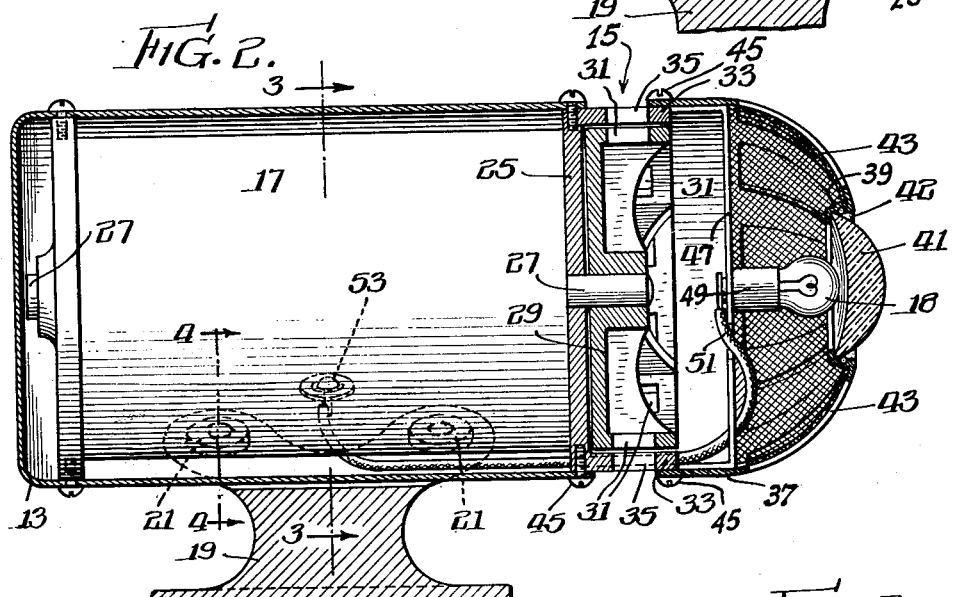
Inventor
William W. Scott
By: Cox & Moore attys Patented Sept. 12, 1939

2,172,413

UNITED STATES PATENT OFFICE 2,172,413

SIREN

William W. Scott, Chicago, Ill., assignor to Federal Electric Company, Inc., Chicago, Ill., a corporation of New York Application December 23, 1935, Serial No. 55,735

4 Claims. (Cl. 177—7)

My invention relates in general to signaling and has more particular reference to a siren or similar audible warning apparatus carrying means adapted to provide a visual warning.

An important object of the invention is to provide a combined visual and audible warning device particularly well adapted for mounting on vehicles, such as are or may at times be entitled to the right of way in traffic.

Another important object is to provide an air whistle or siren having a warning lamp whereby a visual as well as a highly penetrating audible warning may be transmitted.

Another important object is to provide a motor-driven air whistle or siren of generally cylindrical shape adapted for mounting on a vehicle and having a lamp mounted on the forwardly facing end of the siren; a further object being to form the casing of the siren with a cover carrying a lens in front of the lamp, the lens being preferably red in color to project highly visible warning light rays forwardly of the siren.

Among the other important objects are to provide for operating the lamp either steadily or intermittently whenever the sounding device is in operation to provide a visual warning in addition to the audible warning transmitted by the sounding device; to provide for operating the signal lamp whether the audible signaling means is in operation or not, including electrical control means for the audible and the visual elements of the device; to provide signaling means especially well adapted for mounting on a vehicle, such as an ambulance, fire fighting apparatus and other vehicles requiring the right-of-way in traffic; and, in general to improve safety in traffic when emergency conditions require that the way be cleared for certain vehicles, such as fire and police patrols, ambulances, and the like.

Numerous other objects, advantages, and inherent functions of the invention will be apparent from the following description, which, taken in connection with the accompanying drawing, discloses preferred embodiment of the invention.

Referring to the drawing:

Figure 1 is a perspective view of a signaling device embodying my present invention;

Figure 2 is a sectional view taken longitudinally through the device shown in Figure 1;

Figures 3 and 4 are sectional views taken substantially along the lines 3—3 and 4—4 in Figure 2; and Figure 5 is a wiring diagram illustrating an electrical system for controlling the operation of the warning device.

To illustrate my invention, I have shown on the drawing a warning device 11 comprising a frame forming a housing 13, in and on which is mounted a noise-producing device preferably comprising an air whistle or siren 15 and a lamp 18, adapted to produce a visual signal. The housing 13 is a preferably cylindrical shell enclosing a motor 17 for driving the siren. Means is provided for mounting the housing 13 with its axis extending horizontally, said means in the illustrated embodiment comprising a mounting bracket 19 by means of which the apparatus may be secured in position, for example on a vehicle such as an ambulance or other vehicle requiring the right-of-way in traffic.

The frame of the motor is preferably formed with lateral bosses 21, by means of which it may be secured directly on the pedestal 19 by means of the fastening studs 23, which penetrate the pedestal and the material of the housing 13 and take into the bosses of the motor frame.

The rearmost end of the housing 13 may be finished to any desired configuration and the housing is preferably open at its forward end to receive a plate 25 secured to the forward end of the motor casing, said plate enclosing the open end of the housing and having a central perforation through which the motor shaft 27 extends. The end of the shaft 27, which projects forwardly of the plate 25, carries a siren rotor 29, preferably comprising a cylindrical runner, the periphery of which is provided with a plurality of angularly disposed openings or ports 31. The plate 25 also has an annular rim 33 encircling the rim of the siren rotor and having openings or ports 35 opposite the ports 31 of the rotor, so that when the rotor is revolved at high speed, the relative movement of the ports 31 and 35 will create the characteristic sound of the siren.

The assembly also includes a cover 37 formed with a central annular seat 39 defining an opening, in which is mounted a lens 41 preferably of transparent red material such as glass. The lens may be held in the seat in any suitable fashion, as for instance by means of a fastening clip 42. Outwardly of the seat 39, the cover is formed with a plurality of angularly disposed openings 43, while the peripheral rim of the cover is adapted to seat upon the forward edge of the flange 33, the cover being secured on the flange in any suitable fashion as by set screws 45. It will be seen that the cover 37 thus encircles the forward end of the siren. The openings 43, however, permit air to be drawn therethrough into the cover and thence into the interior of the rotor in position to be expelled thence through the openings 31 and 35 whenever the same are in registration during the operation of the siren.

The cover 37, inwardly of its peripheral edge, is provided with bracket means 47 carrying a lamp socket 49 in position to support the lamp 18 centrally behind the lens 41. The socket 49 preferably comprises a threaded shell electrically connected with the support 47 and hence grounded, on the frame of the device. The support socket also includes a central insulated terminal carried by the bracket 47 and connected, as by means of a conductor 51, with an insulated terminal 53 mounted on the casing 13 adjacent the support standard 19. The motor 17 also is or may be grounded on one side of the frame of the apparatus, as indicated at 54, the motor being connected, on its other side, with an insulated terminal 55 mounted on the housing 13. The terminal 55 is connected by means of a conductor 57 with one side of a control switch, the other side of which is connected by means of a conductor 61 with a power source 63, preferably comprising a battery forming a part of the ignition system of the vehicle on which the device is mounted. The other side of the battery is preferably grounded as shown at 65.

The lamp terminal 53 is also connected with the battery 63 in any suitable or convenient manner, preferably through a control switch 67. A flashing device 69, by means of which the lamp may be automatically operated in an intermittent fashion, may also be included in the lamp circuit. I prefer also to provide a pair of single pole, double-throw switches 71 and 73 in the lamp circuit in order that the lamp and motor may be selectively interconnected to permit operation of the siren alone or in conjunction with the lamp upon closure of the switch 59 and also to permit operation of the lamp alone when the switch 59 is open.

The switches 71 and 73 also permit the lamp, whether it is operating independently or in conjunction with the siren, to operate either continuously or intermittently. To this end, the poles of the switches 71 and 73 are or may be connected together while the two stationary contacts of the switch 71 are connected respectively with the conductors 57 and 61, so that the lamp may be connected either directly with the power source 63 or connected with said source through the switch 59. The two terminals of the switch 73 also are respectively connected, the one directly with the control switch 67 and the other with said control switch through the flasher device 69. When the pole of the switch 73 is in position engaging the upper contact of the switch, the lamp, when energized, will operate continuously. When the pole of the switch 73 is in engagement with the lower contact, the lamp will operate intermittently under the control of the flasher 69. Likewise, when the pole of the switch 71 is in position engaging the upper contact of said switch, the lamp will be operated, providing the switch 67 is closed, whenever the switch 59 is closed, that is to say, whenever the siren is placed in operation. If, however, the pole of the switch 71 is positioned to engage the lower contact of said switch, the lamp may be operated independently of the siren simply by closing the switch 67.

The flasher 69 may be of any suitable or convenient form and may be a self-actuating flasher of the character used in light flashing circuits. I prefer, however, to arrange the flasher 69 as a rotary make and break switch, driven by a small motor 75, which is connected to receive power from the battery 63 preferably under the control of the lamp control switch 67, the motor 75 being connected between the lamp-connected end of said switch 67 and ground as shown.

The combination audible and visual warning of my present invention is of great value for use on vehicles, such as ambulances, police patrols, mobile fire equipment, and, in fact, on any vehicle requiring the right-of-way in traffic, since the device not only issues a signal audible at a great distance but also a clearly visual light, which may be caused to flash in a highly eye-arresting fashion, thereby giving visual as well as audible warning of the near approach of the vehicle on which the device is mounted and thus affording a better opportunity for clearing the way for its passage.

It is thought that the invention and numerous of its attendant advantages and inherent functions will be understood from the foregoing description and it is obvious that numerous changes may be made in the form, construction, and arrangement of the several parts without departing from the spirit or scope of my invention or sacrificing all of its attendant advantages, the preferred form herein described being merely for the purpose of illustrating the invention.

Having thus described my invention, what I claim as new and desire to secure by Letters Patent is as follows:

1. A signaling device comprising a siren having an annular ported member and a runner rotatable within the ported member, an electric motor at one end of and secured to said ported member, said motor having a shaft extending axially with respect to the ported member and drivingly connected with said runner for the purpose of rotating the same within the ported member, cover means enclosing the other end of said ported member, said cover means affording a window opening and having a plurality of other openings therein disposed adjacent said window opening, said other openings permitting the entrance of air therethrough to said runner, and means to support a lamp within said cover in position to project light rays through said window opening axially outwardly of said runner.

2. A signaling device comprising a frame, means on said frame forming an annular ported member, an electric motor on said frame at one end of the ported member and having a shaft extending within said ported member, a runner rotatable within said ported member and drivingly connected with said shaft, cover means on and enclosing the other end of said ported member, said cover means having a plurality of openings affording access of air to said runner, said cover means being formed with a lens seat and window opening therein opposite said runner, a lens on said seat and extending in said window opening, and means to support a lamp within said cover opposite said lens.

3. A signaling device comprising a siren having an annular ported member and a runner rotatable within the ported member, an electric motor at one end of and secured to said ported member, said motor having a shaft extending axially with respect to the ported member and drivingly connected with said runner for the purpose of rotating the same within the ported member, cover means enclosing the other end of said ported member, said cover means affording a central window opening and having a plurality of circumferentially arranged openings therein disposed peripherally of said window opening, said circumferentially arranged openings permitting the entrance of air therethrough to said runner, and means to support a lamp within said cover in position to project light rays through said window opening axially outwardly of said runner.

4. A signaling device comprising a siren having an annular ported member and a runner rotatable within the ported member, an electric motor at one end of and secured to said ported member, said motor having a shaft extending axially with respect to the ported member and drivingly connected with said runner for the purpose of rotating the same within the ported member, semispherically shaped cover means enclosing the other end of said ported member, said cover means affording a central window opening and having a plurality of circumferentially arranged openings therein disposed peripherally of said window opening, said circumferentially arranged openings extending radially outwardly from the peripheral edge of the window opening to the outer zone of the cover means and being separated by relatively narrow imperforate cover means portions whereby to permit the free entrance of air to said runner, and means to support a lamp within said cover in position to project light rays through said window opening axially outwardly of said runner.

WILLIAM W. SCOTT.